(12) United States Patent  
Kimura et al.

(10) Patent No.: US 12,372,375 B2
(45) Date of Patent: Jul. 29, 2025

(54) POLYGON SEARCH METHOD

(71) Applicant: NIPPON TELEGRAPH AND TELEPHONE CORPORATION, Tokyo (JP)

(72) Inventors: Tatsuro Kimura, Musashino (JP); Ichibe Naito, Musashino (JP); Kazuhiro Miyahara, Musashino (JP); Atsushi Isomura, Musashino (JP); Tomoya Ikeda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 159 days.

(21) Appl. No.: 17/617,312

(22) PCT Filed: Jun. 11, 2019

(86) PCT No.: PCT/JP2019/023152
§ 371 (c)(1),
(2) Date: Dec. 8, 2021

(87) PCT Pub. No.: WO2020/250313
PCT Pub. Date: Dec. 17, 2020

(65) Prior Publication Data
US 2022/0252423 A1    Aug. 11, 2022

(51) Int. Cl.
*G01C 21/00*    (2006.01)
*G01C 21/32*    (2006.01)

(52) U.S. Cl.
CPC ......... *G01C 21/3867* (2020.08); *G01C 21/32* (2013.01); *G01C 21/3815* (2020.08)

(58) Field of Classification Search
CPC ............ G01C 21/3867; G01C 21/32; G01C 21/3815; G06F 16/587
See application file for complete search history.

(56) References Cited

U.S. PATENT DOCUMENTS 6,622,085 B1 *  9/2003  Amita ............... G06T 11/203
                                                340/995.14
2002/0065603 A1 *  5/2002  Watanabe .......... G01C 21/30
                                                340/988

(Continued)

FOREIGN PATENT DOCUMENTS

EP     1182611 A1    2/2002
JP     9-292254 A    11/1997

(Continued)

OTHER PUBLICATIONS

Ježek, Jan, and Ivana Kolingerová. "Stcode: The text encoding algorithm for latitude/longitude/time." Connecting a Digital Europe Through Location and Place (2014): 163-177. (Year: 2014).*

(Continued)

*Primary Examiner* — Faris S Almatrahi
*Assistant Examiner* — Dana F Artimez
(74) *Attorney, Agent, or Firm* — XSENSUS LLP

(57) ABSTRACT

A polygon retrieving method includes converting a random polygonal area indicating a shape of each lane of a road within a predetermined unit area on a map into polygonal information indicated using coordinates of vertexes of the polygonal area and storing the polygonal information in the storage in association with a unit area, specifying temporospatial information including positional information corresponding to coordinates within the predetermined unit area on the map, and extracting all temporospatial information including positional information corresponding to coordinates inside a polygonal area indicated by the polygonal information associated with the unit area among the specified temporospatial information, by processing circuitry.

12 Claims, 7 Drawing Sheets

MAP INFORMATION

POLYGONAL INFORMATION

(56) References Cited

U.S. PATENT DOCUMENTS

2011/0109475 A1    5/2011  Basnayake et al.
2017/0089717 A1    3/2017  White et al.
2021/0099307 A1*   4/2021  Rolf ..................... H04L 9/0643

FOREIGN PATENT DOCUMENTS

| JP | 2008-249539 A |   | 10/2008 |
| JP | 2011-169631 A |   | 9/2011 |
| JP | 2018132689 A | * | 8/2018 |
| WO | 00/43953 A1 |   | 7/2000 |

OTHER PUBLICATIONS

JP2018132689A_English Translation (Year: 2018).*
Jezek et al., "STCode: The Text Encoding Algorithm for Latitude/Longitude/Time", Connecting a Digital Europe Through Location and Place, Available Online at: https://link.springer.com/chapter/10.1007%2F978-3-319-03611-3_10, May 2014, 5 pages.

* cited by examiner

Fig. 2

| ROAD CENTER COORDINATE LIST | [(0.5, 1.7), (1.4, 2.1), ···, (0.2, 1.8)] |
|---|---|
| ROAD WIDTH | 5m |
| NUMBER OF LANES | 3 |

| POLYGON VERTEX LIST | [(0.2, 1.3), (1.2, 1.4), ···, (-0.3, 2.2)] |
|---|---|
| SPACE MESH | MESH NUMBER 10 |

| TIME | LONGITUDE | LATITUDE | DATA PORTION |
|---|---|---|---|
| 2019/1/1 10:15:30 | 27.1984° | −15.2958° | data1 |

14c

POLYGON SEARCH METHOD

CROSS-REFERENCE TO RELATED APPLICATION

The present application is based on PCT filing PCT/JP2019/023152, filed Jun. 11, 2019, the entire contents of which are incorporated herein by reference.

TECHNICAL FIELD

The present invention relates to a polygon retrieving method.

BACKGROUND ART

For example, when temporospatial information including a position and a time of an automobile which is within a predetermined area on a map is retrieved, the map information is partitioned in rectangles (meshes) defined in advance and the temporospatial information of the automobile which is within an area designated with the rectangle is acquired in the related art. At this time, a technology for retrieving temporospatial information as a 1-dimensional bit string at a high speed is disclosed (see NPL 1).

CITATION LIST

Non Patent Literature

[NPL 1] "STCode: The Text Encoding Algorithm for Latitude/Longitude/Time", [online] May 2014, Springer, [retrieved on May 20, 2019].

SUMMARY OF THE INVENTION

Technical Problem

However, according to the technology of the related art, it is difficult to perform retrieval of temporospatial information with high accuracy in some cases. For example, it is difficult to accurately retrieve temporospatial information of an automobile which is within an area designated with a polygon on a specific road within the area designated by a rectangle. The present invention has been devised in view of the foregoing circumstances and an objective of the present invention is to perform retrieval of temporospatial information with high accuracy.

Means for Solving the Problem

To solve the above-described problem and achieve the objective, a polygon retrieving method according to the present invention is a method including: converting a random polygonal area indicating a shape of each lane of a road within a predetermined unit area on a map into polygonal information indicated using coordinates of vertexes of the polygonal area and storing the polygonal information in the storage in association with a unit area; specifying temporospatial information including positional information corresponding to coordinates within the predetermined unit area on the map; and extracting all temporospatial information including positional information corresponding to coordinates inside a polygonal area indicated by the polygonal information associated with the unit area among the specified temporospatial information, by processing circuitry.

Effects of the Invention

According to the present invention, it is possible to perform retrieval of temporospatial information with high accuracy.

BRIEF DESCRIPTION OF DRAWINGS

FIG. 2 is a diagram illustrating a data structure of map information.

FIG. 3 is a diagram illustrating a data structure of polygonal information.

FIG. 4 is a diagram illustrating a data structure of temporospatial information.

DESCRIPTION OF EMBODIMENTS

Figure 1:
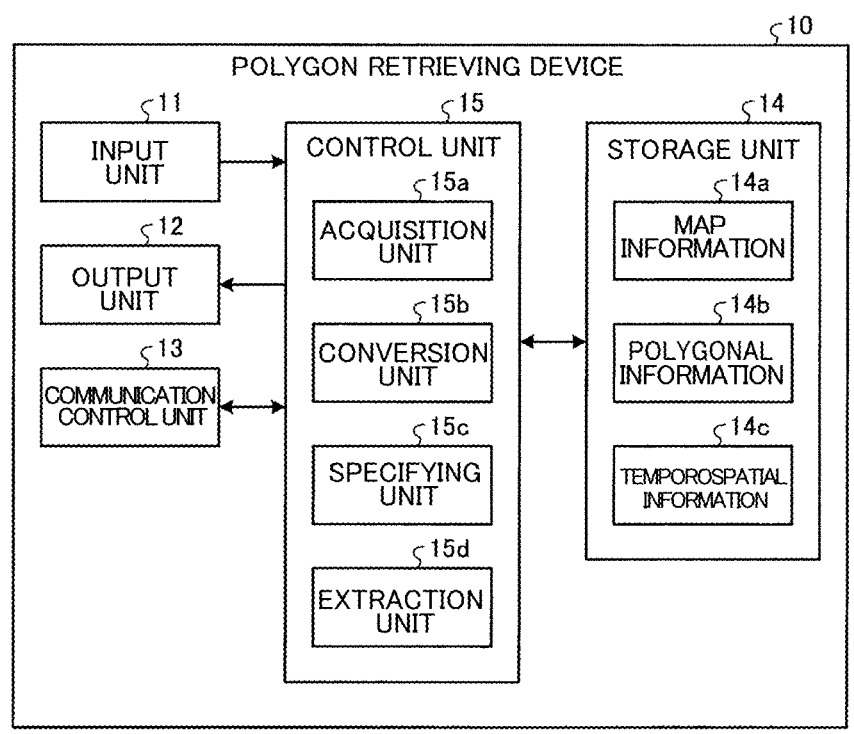
FIG. 1 is a schematic diagram illustrating an overall configuration of a polygon retrieving device according to an embodiment.

Hereinafter, an embodiment of the present invention will be described in detail with reference to the drawings. The present invention is not limited to the embodiment. In the description of the drawings, the same reference numerals are given to the same units.

[Configuration of polygon retrieving device] FIG. 1 is a schematic diagram illustrating an overall configuration of a polygon retrieving device according to an embodiment. As exemplified in FIG. 1, a polygon retrieving device 10 according to the embodiment is realized by a general-purpose computer such as a PC and includes an input unit 11, an output unit 12, a communication control unit 13, a storage unit 14, and a control unit 15.

The input unit 11 is realized using an input device such as a keyboard or a mouse and inputs various kinds of instruction information such as a processing start to the control unit 15 in response to an input operation performed by an operator. The output unit 12 is realized by a display device such as a liquid crystal display, a printing device such as a printer, or the like. For example, a result of a polygon retrieving process to be described below is displayed on the output unit 12.

The communication control unit 13 is realized by a network interface card (NIC) or the like and controls communication between the control unit 15 and an external device via an electrical communication line such as a local area network (LAN) or the Internet. For example, the communication control unit 13 controls communication between the control unit 15 and a management device or the like that manages map information, temporospatial information, and the like to be described below.

The storage unit 14 is realized by a semiconductor memory element such as a random access memory (RAM) or a flash memory or a storage device such as a hard disk or an optical disc. The storage unit 14 stores a processing program for operating the polygon retrieving device 10, data used during execution of the processing program, and the like in advance or temporarily every time processing is performed. The storage unit 14 may be configured to communicate with the control unit 15 via the communication control unit 13.

In the embodiment, the storage unit 14 stores map information 14a, polygonal information 14b, temporospatial information 14c, and the like. The information is collected or generated and stored in the storage unit 14 earlier than a polygon retrieving process to be described below.

For example, an acquisition unit 15a to be described below collects the map information 14a from the management device or the like that manages the map information and stores the map information 14a in the storage unit 14. The acquisition unit 15a collects the temporospatial information 14c from the management device or the like that manages temporospatial information output from a sensor or the like and stores the temporospatial information 14c in the storage unit 14. A conversion unit 15b to be described below generates the polygonal information 14b and stores the polygonal information 14b in the storage unit 14.

These various kinds of information are not limited to a case in which the information is stored in the storage unit 14 of the polygon retrieving device 10. For example, the information may be collected or generated when a polygon retrieving process to be described below is performed.

The map information 14a includes coordinates of a representative point of a polygonal area on a map. For example, the map information 14a is information that includes coordinates of a central point of a polygonal area on a road and expresses the shape of the road on a map using a list of the coordinates of a road center, a road width, or the like.

Here, FIG. 2 is a diagram illustrating a data structure of the map information 14a. In FIG. 2, the map information 14a indicating a shape of a road is exemplified. As illustrated in FIG. 2, the map information 14a indicating the shape of the road includes a road center coordinate list, a road width, and the number of lanes. The road center coordinate list is a list of coordinates of a road center. An example illustrated in FIG. 2 expresses a shape of a road in which the coordinates of a central point of a road are (0.5, 1.7), (1.2, 1.4) and the like, a road width is 5 m, and the number of lanes of the road is 3.

The polygonal information 14b is information indicating that the coordinates of vertexes of a polygonal area are used to express the polygonal area within a predetermined unit area on a map and is information generated by the conversion unit 15b to be described below and associated with the unit area.

Specifically, FIG. 3 is a diagram illustrating a data structure of the polygonal information 14b. In the polygonal information 14b illustrated in FIG. 3, a polygon vertex list and a space mesh are associated with each other. The polygon vertex list is a set of coordinates of vertexes of a polygonal area on a map. In FIG. 3, coordinates of vertexes of a polygonal area such as (0.2, 1.3), (1.2, 1.4) are enumerated. The space mesh is information for identifying the unit area of a rectangle defined on the map (hereinafter referred to as a mesh ID). In FIG. 3, mesh number 10 is exemplified.

The temporospatial information 14c is information such as sensor values including positional information and temporal information and is, for example, information indicating a travel position of an automobile. In the embodiment, the temporospatial information is a 1-dimensional bit string including positional information and temporal information.

Specifically, FIG. 4 is a diagram illustrating a data structure of the temporospatial information 14c. The temporospatial information 14c exemplified in FIG. 4 includes a time serving as temporal information, longitude and latitude serving as positional information, and a data portion such as a sensor value. In FIG. 4, the temporospatial information 14c indicating a 1-dimensional bit string of a time "2019/1/1 10:15:30", a longitude "27.1984°", a latitude "−15.2958°", and a data portion "data1" is exemplified.

The description will now return to FIG. 1. The control unit 15 is realized using a central processing unit (CPU) and the like and executes a processing program stored in a memory. Thus, as exemplified in FIG. 1, the control unit 15 functions as an acquisition unit 15a, a conversion unit 15b, a specifying unit 15c, and an extraction unit 15d. All or some of the functional units may be mounted in different hardware. The control unit 15 may include other functional units.

The acquisition unit 15a collects the map information 14a from the management device or the like that manages the map information via the input unit 11 or the communication control unit 13 and stores the map information 14a in the storage unit 14. The acquisition unit 15a collects the temporospatial information 14c from a management device or the like that manages the temporospatial information output from a sensor or the like via the input unit 11 or the communication control unit 13 and stores the temporospatial information 14c in the storage unit 14.

The acquisition unit 15a may transmit such information to the conversion unit 15b or the specifying unit 15c to be described below without storing the information in the storage unit 14.

The conversion unit 15b converts a polygonal area within the predetermined unit area on a map into the polygonal information 14b indicated using coordinates of vertexes of the polygonal area and stores the polygonal information in the storage unit 14 in association with the unit area.

Specifically, the conversion unit 15b converts the polygonal area into the polygonal information 14b indicating a polygonal area using the map information 14a including coordinates of a representative point of the polygonal area.

Figure 5:
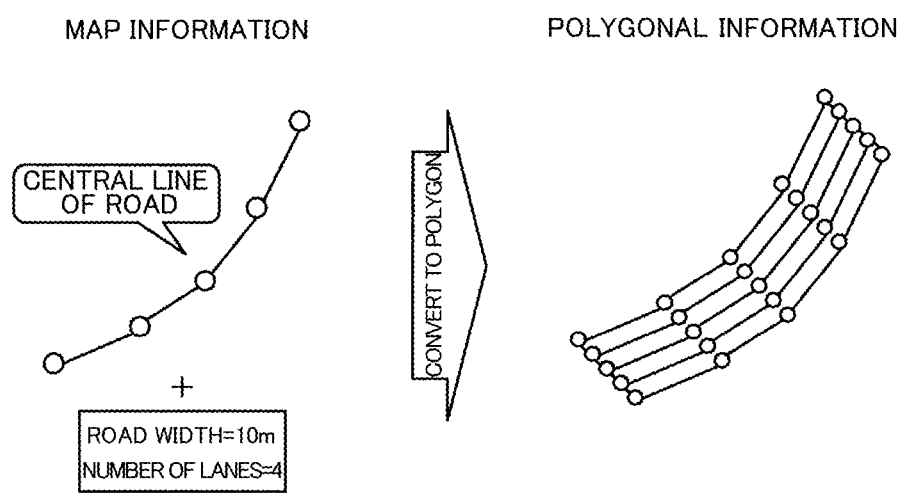
FIG. 5 is a diagram illustrating a process of a conversion unit.

Here, FIG. 5 is a diagram illustrating a process of the conversion unit 15b. As illustrated in FIG. 5, the conversion unit 15b specifies a central line of a road by connecting coordinates of the center of the road with reference to the map information 14a and specifies coordinates of vertexes of a polygonal area expressed on the road using a road width and the number of lanes. In FIG. 5, polygonal information expressed by coordinates of vertexes of four polygonal areas indicating four lanes on a road is exemplified.

The conversion unit 15b converts the polygonal area within the unit area into the polygonal information 14b indicated by a set of the coordinates of the vertexes of the polygonal area for each rectangular unit area identified with a mesh ID defined on the map and stores the polygonal information 14b in the storage unit 14 in association with the mesh ID. The conversion unit 15b may transmit the polygonal information 14b to the extraction unit 15d to be described below without storing the polygonal information 14b in the storage unit 14.

The description will now return to FIG. 1. The specifying unit 15c specifies the temporospatial information 14c including the positional information corresponding to the coordinates within the predetermined area on the map. Specifically, the specifying unit 15c retrieves and specifies the temporospatial information 14c including the positional information corresponding to the coordinates within the unit area for each mesh ID.

The extraction unit 15d extracts the temporospatial information 14c including the positional information corresponding to the coordinates inside the polygonal area indicated by the polygonal information 14b associated with the unit area among the temporospatial information 14c specified by the specifying unit 15c.

Specifically, the extraction unit 15*d* extracts the temporospatial information 14*c* corresponding to the inside of the polygonal area within the unit area among the temporospatial information 14*c* specified by the specifying unit 15*c* with reference to the polygonal information 14*b* for each mesh ID. For example, the extraction unit 15*d* extracts the temporospatial information 14*c* including the positional information corresponding to the coordinates inside the polygonal area indicated by the polygonal information using the geometric algorithm information. In this case, the extraction unit 15*d* applies, for example, points-in-polygon (PIP) processing using a geometric algorithm library and determines whether the coordinates of the temporospatial information 14*c* on the map are inside the polygonal area indicated by the polygonal information.

The extraction unit 15*d* outputs the extracted temporospatial information 14*c* to, for example, the output unit 12 or an application such as automated driving or route guidance. Thus, the user can further detect the temporospatial information inside the polygonal area among the temporospatial information within the rectangular unit area defined on the map with high accuracy.

Figure 6:
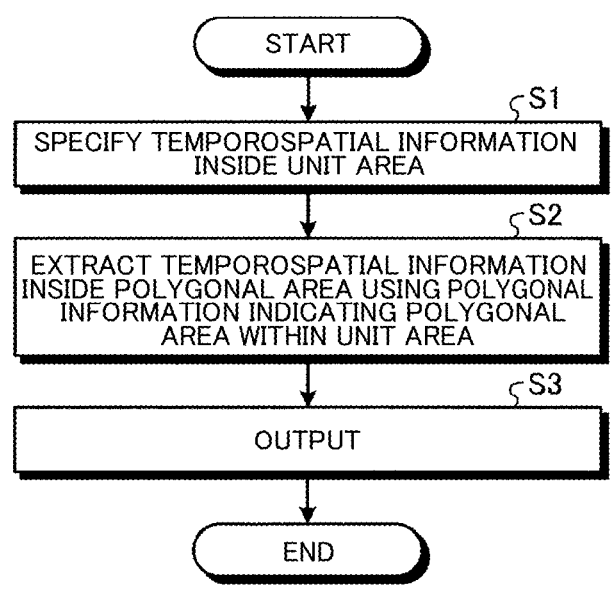
FIG. 6 is a flowchart illustrating an order of a polygon retrieving process.

[Polygon retrieving process] Next, a polygon retrieving process performed by the polygon retrieving device 10 according to the embodiment will be described with reference to FIG. 6. FIG. 6 is a flowchart illustrating an order of the polygon retrieving process. The flowchart of FIG. 6 starts at, for example, a timing at which the user performs an input operation of giving a start instruction.

First, before the flowchart of FIG. 6 starts, the conversion unit 15*b* converts the polygonal area within the rectangular unit area identified with the mesh ID defined on the map into the polygonal information 14*b* indicated using the coordinates of the vertexes of the polygonal area. For example, the conversion unit 15*b* converts the polygonal area into the polygonal information 14*b* indicating the polygonal area using the map information 14*a* including the coordinates of the representative point of the polygonal area. The conversion unit 15*b* stores the converted polygonal information 14*b* in the storage unit 14 in association with the mesh ID of the unit area.

When the flowchart starts, the specifying unit 15*c* specifies the temporospatial information 14*c* including the positional information corresponding to the coordinates within the predetermined unit area on the map (step S1). Specifically, for the temporospatial information 14*c* collected by the acquisition unit 15*a*, the specifying unit 15*c* retrieves and specifies the temporospatial information 14*c* including the positional information corresponding to the coordinates within the unit area for each mesh ID.

Subsequently, the extraction unit 15*d* extracts the temporospatial information 14*c* including the positional information corresponding to the coordinates inside the polygonal area indicated by the polygonal information 14*b* associated with the unit area among the temporospatial information 14*c* specified by the specifying unit 15*c* (step S2). Specifically, the extraction unit 15*d* extracts the temporospatial information 14*c* inside the polygonal area within the unit area among the temporospatial information 14*c* specified by the specifying unit 15*c* with reference to the polygonal information 14*b* for each mesh ID.

The extraction unit 15*e* outputs the extracted temporospatial information 14*c* to the output unit 12 or the application such as automated driving or route guidance (step S3). Then, the series of the polygon retrieving process ends.

As described above, in the polygon retrieving device 10 according to the embodiment, the conversion unit 15*b* converts the polygonal area within the predetermined unit area on the map into the polygonal information 14*b* indicated using the coordinates of the vertexes of the polygonal area and stores the polygonal information 14*b* in the storage unit 14 in association with the unit area. Specifically, the conversion unit 15*b* converts the polygonal area into the polygonal information 14*b* indicating the polygonal area using the map information 14*a* including the coordinates of the representative point of the polygonal area.

The specifying unit 15*c* specifies the temporospatial information 14*c* including the positional information corresponding to the coordinates within the predetermined unit area on the map. The extraction unit 15*d* extracts the temporospatial information 14*c* including the positional information corresponding to the coordinates inside the polygonal area indicated by the polygonal information 14*b* associated with the unit area among the specified temporospatial information 14*c*. Specifically, the extraction unit 15*d* extracts the temporospatial information 14*c* including the positional information corresponding to the coordinates inside the polygonal area indicated by the polygonal information 14*b* using the geometric algorithm information.

Thus, the polygon retrieving device 10 can further detect temporospatial information inside a polygonal area among temporospatial information within a rectangular unit area defined on a map. For example, the polygon retrieving device 10 can detect an automobile which is on a specific road. In this way, through the polygon retrieving process of the polygon retrieving device 10, it is possible to retrieve temporospatial information with high accuracy.

The temporospatial information 14*c* is a 1-dimensional bit string including positional information and temporal information. Thus, through the polygon retrieving process, it is possible to retrieve temporospatial information at a higher speed.

[Program] It is also possible to generate a program in which a process performed by the polygon retrieving device 10 according to the foregoing embodiment is described in a computer-executable language. As an embodiment, the polygon retrieving device 10 can be mounted by installing a polygon retrieving program that performs the foregoing polygon retrieving process on a desired computer as package software or online software. For example, by causing an information processing device to perform the foregoing polygon retrieving program, it is possible to cause the information processing device to function as the polygon retrieving device 10. The information processing device mentioned here includes a desktop or notebook type personal computer. In addition, a mobile communication terminal such as a smartphone, a mobile phone, or a personal handyphone system (PHS) and a slate terminal such as a personal digital assistant (PDA) are included in the category of the information processing device. A function of the polygon retrieving device 10 may be mounted on a cloud server.

Figure 7:
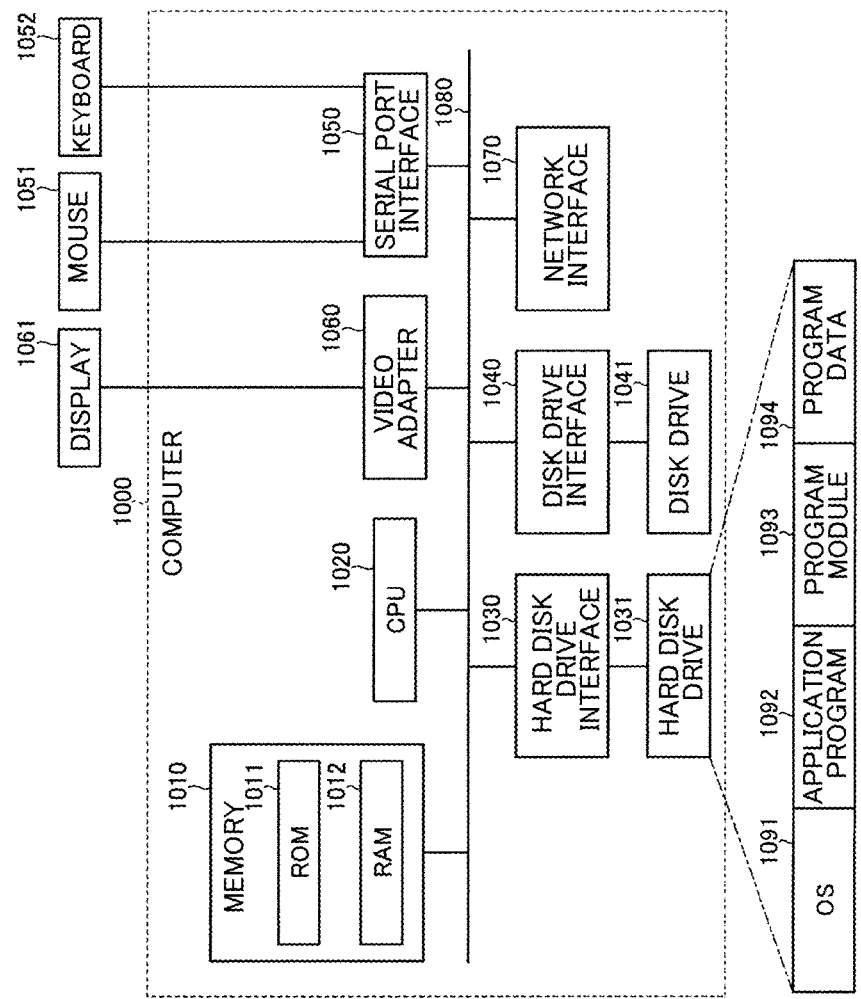
FIG. 7 is a diagram illustrating an example of a computer that executes a polygon retrieving program.

FIG. 7 is a diagram illustrating an example of a computer that executes the polygon retrieving program. A computer 1000 includes, for example, a memory 1010, a CPU 1020, a hard disk drive interface 1030, a disk drive interface 1040, a serial port interface 1050, a video adapter 1060, and a network interface 1070. These units are connected by a bus 1080.

The memory 1010 includes a read-only memory (ROM) 1011 and a RAM 1012. The ROM 1011 stores, for example, a boot program such as a basic input output system (BIOS). The hard disk drive interface 1030 is connected to a hard disk drive 1031. The disk drive interface 1040 is connected to a disk drive 1041. For example, a detachably mounted storage medium such as a magnetic disk or an optical disc is inserted into the disk drive 1041. For example, a mouse 1051 and a keyboard 1052 are connected to the serial port interface 1050. For example, a display 1061 is connected to the video adapter 1060.

Here, the hard disk drive 1031 stores, for example, an OS 1091, an application program 1092, a program module 1093, and program data 1094. The information described in the foregoing embodiment is stored in, for example, the hard disk drive 1031 or the memory 1010.

The polygon retrieving program is stored as, for example, the program module 1093 in which an instruction performed by the computer 1000 is described in the hard disk drive 1031. Specifically, the program module 1093 in which each process performed by the polygon retrieving device 10 described in the foregoing embodiment is described is stored in the hard disk drive 1031.

Data used for information processing by the polygon retrieving program is stored as the program data 1094 in, for example, the hard disk drive 1031. The CPU 1020 reads the program module 1093 or the program data 1094 stored in the hard disk drive 1031 to the RAM 1012 as necessary to perform each of the above-described procedures.

The program module 1093 or the program data 1094 related to the polygon retrieving program are not limited to a case in which the program module 1093 or the program data 1094 are stored in the hard disk drive 1031. For example, the program module 1093 or the program data 1094 may be stored in, for example, a detachably mounted storage medium to be read by the CPU 1020 via the disk drive 1041 or the like. Alternatively, the program module 1093 or the program data 1094 related to the polygon retrieving program may be stored in another computer connected via a network such as a LAN or a wide area network (WAN) to be read by the CPU 1020 via the network interface 1070.

The embodiments to which the present invention of the present inventors is applied have been described, but the present invention is not limited by the description and the drawings which are part of the disclosure of the present invention. That is, other embodiments, examples, and operational technologies conceived by those skilled in the art based on the embodiments are all included in the scope of the present invention.

REFERENCE SIGNS LIST

10 Polygon retrieving device
11 Input unit
12 Output unit
13 Communication control unit
14 Storage unit
14a Map information
14b Polygonal information
14c Temporospatial information
15 Control unit
15a Acquisition unit
15b Conversion unit
15c Specifying unit
15d Extraction unit

The invention claimed is:

1. A polygon retrieving method comprising:
    converting a random polygonal area indicating a shape of each lane of a road within a predetermined unit area on a map into polygonal information indicated using coordinates of vertexes of the polygonal area and associating the polygonal information with a mesh identifier of the predetermined unit area, every unit area on the map having a mesh identifier, the unit area corresponding to a mesh into which the map is divided;
    specifying temporospatial information including positional information corresponding to coordinates within the predetermined unit area corresponding to the mesh identifier;
    extracting all temporospatial information including positional information corresponding to coordinates inside the polygonal area indicated by the polygonal information associated with the mesh identifier of the predetermined unit area among the specified temporospatial information, by processing circuitry; and
    outputting the extracted temporospatial information to a display, an automated driving application, a guidance application, or any combination thereof, to allow a user to detect the temporospatial information,
    wherein the temporospatial information is a 1-dimensional bit string including the positional information, temporal information, and data other than the positional information and the temporal information.

2. The polygon retrieving method according to claim 1, wherein, in the converting, the polygonal area is converted into the polygonal information indicating the polygonal area using map information including coordinates of a representative point of the polygonal area.

3. The polygon retrieving method according to claim 1, wherein, in the extracting, the temporospatial information including positional information corresponding to coordinates inside the polygonal area indicated by the polygonal information is extracted using geometric algorithm information.

4. The polygon retrieving method according to claim 1, further including generating the polygonal area using map information including road center coordinates, a road width, and a number of lanes.

5. A non-transitory computer-readable medium encoded with computer-readable instructions that, when executed by a computer, cause the computer to perform a polygon retrieving method comprising:
    converting a random polygonal area indicating a shape of each lane of a road within a predetermined unit area on a map into polygonal information indicated using coordinates of vertexes of the polygonal area and associating the polygonal information with a mesh identifier of the predetermined unit area, every unit area on the map having a mesh identifier, the unit area corresponding to a mesh into which the map is divided;
    specifying temporospatial information including positional information corresponding to coordinates within the predetermined unit area corresponding to the mesh identifier;
    extracting all temporospatial information including positional information corresponding to coordinates inside the polygonal area indicated by the polygonal information associated with the mesh identifier of the predetermined unit area among the specified temporospatial information, by processing circuitry; and
    outputting the extracted temporospatial information to a display, an automated driving application, a guidance application, or any combination thereof, to allow a user to detect the temporospatial information,
    wherein the temporospatial information is a 1-dimensional bit string including the positional information, temporal information, and data other than the positional information and the temporal information.

6. The non-transitory computer-readable medium according to claim 5, wherein, in the converting, the polygonal area is converted into the polygonal information indicating the polygonal area using map information including coordinates of a representative point of the polygonal area.

7. The non-transitory computer-readable medium according to claim 5, wherein, in the extracting, the temporospatial information including positional information corresponding to coordinates inside the polygonal area indicated by the polygonal information is extracted using geometric algorithm information.

8. The non-transitory computer-readable medium according to claim 5, further including generating the polygonal area using map information including road center coordinates, a road width, and a number of lanes.

9. A polygon retrieving apparatus, comprising:
a memory; and
circuitry configured to
    convert a random polygonal area indicating a shape of each lane of a road within a predetermined unit area on a map into polygonal information indicated using coordinates of vertexes of the polygonal area and associate the polygonal information with a mesh identifier of the predetermined unit area, every unit area on the map having a mesh identifier, the unit area corresponding to a mesh into which the map is divided;
    specify temporospatial information including positional information corresponding to coordinates within the predetermined unit area corresponding to the mesh identifier;
    extract all temporospatial information including positional information corresponding to coordinates inside the polygonal area indicated by the polygonal information associated with the mesh identifier of the predetermined unit area among the specified temporospatial information, by processing circuitry; and
    output the extracted temporospatial information to a display, an automated driving application, a guidance application, or any combination thereof, to allow a user to detect the temporospatial information,
    wherein the temporospatial information is a 1-dimensional bit string including the positional information, temporal information, and data other than the positional information and the temporal information.

10. The polygon retrieving apparatus according to claim 9, wherein, in the converting, the polygonal area is converted into the polygonal information indicating the polygonal area using map information including coordinates of a representative point of the polygonal area.

11. The polygon retrieving apparatus according to claim 9, wherein, in the extracting, the temporospatial information including positional information corresponding to coordinates inside the polygonal area indicated by the polygonal information is extracted using geometric algorithm information.

12. The polygon retrieving apparatus according to claim 9, further including generating the polygonal area using map information including road center coordinates, a road width, and a number of lanes.

* * * * *